US010761283B2

(12) United States Patent
Je et al.

(10) Patent No.: US 10,761,283 B2
(45) Date of Patent: Sep. 1, 2020

(54) OPTICAL INTERCONNECTION AND METHOD FOR MAKING THE SAME

(71) Applicant: LESSENGERS Inc., Pohang-si, Gyeongsangbuk-do (KR)

(72) Inventors: Jung Ho Je, Pohang-si (KR); Chong Cook Kim, Seoul (KR); Nam Ho Kim, Ulsan (KR)

(73) Assignee: LESSENGERS Inc., Gyeongsangbuk-do (KR)

(*) Notice: Subject to any disclaimer, the term of this patent is extended or adjusted under 35 U.S.C. 154(b) by 235 days.

(21) Appl. No.: 15/746,921

(22) PCT Filed: Nov. 28, 2017

(86) PCT No.: PCT/KR2017/013683
§ 371 (c)(1),
(2) Date: Apr. 4, 2018

(87) PCT Pub. No.: WO2019/088344
PCT Pub. Date: May 9, 2019

(65) Prior Publication Data
US 2019/0384025 A1    Dec. 19, 2019

(30) Foreign Application Priority Data

Oct. 30, 2017  (KR) .................. 10-2017-0142404

(51) Int. Cl.
G02B 6/43    (2006.01)
G02B 6/10    (2006.01)
G02B 6/13    (2006.01)
(52) U.S. Cl.
CPC .............. G02B 6/43 (2013.01); G02B 6/107 (2013.01); G02B 6/13 (2013.01)

(58) Field of Classification Search
CPC .................................................. G02B 6/107
See application file for complete search history.

(56) References Cited

U.S. PATENT DOCUMENTS 6,882,051 B2 *   4/2005   Majumdar ............. B82Y 10/00
                                                        257/746
2013/0088764 A1 *  4/2013   Cha ....................... G02B 26/103
                                                        359/197.1
(Continued)

FOREIGN PATENT DOCUMENTS

KR    10-2012-0133771 A    12/2012
KR    10-2013-0052825 A     5/2013
(Continued)

OTHER PUBLICATIONS

International Search Report dated Jul. 24, 2018 issued in International Application No. PCT/KR2017/013683 with translation (5 pages).
(Continued)

Primary Examiner — Sung H Pak
(74) Attorney, Agent, or Firm — Nixon & Vanderhye P.C.

(57) ABSTRACT

The present invention relates to an optical interconnection for interconnecting a first contact and a second contact, which need to be optically interconnected, the optical interconnection comprising: a nanorod formed on at least one of the first contact and the second contact; and a nanowire extending from the first contact or the nanorod formed on the first contact so as to transmit an optical signal toward the second contact or the nanorod formed on the second contact. The optical interconnection according to the present invention shows improved optical signal characteristics due to a reduction in coupling loss.

14 Claims, 5 Drawing Sheets

(56) References Cited

U.S. PATENT DOCUMENTS

2013/0126824 A1* 5/2013 Shih .................. H01L 33/18
                                              257/9
2014/0182021 A1* 6/2014 Gluckstad .......... A61B 1/00158
                                              850/32
2015/0355227 A1* 12/2015 Gluckstad ............. G01Q 60/22
                                              850/32

FOREIGN PATENT DOCUMENTS

| KR | 10-2013-0057546 A | 6/2013 |
| KR | 10-2015-0090958 A | 8/2015 |
| KR | 10-1583736 B1 | 1/2016 |

OTHER PUBLICATIONS

Office Action dated Jun. 29, 2018 in Application No. 10-2017-0142404 with English translation (8 pages).

\* cited by examiner

[fig. 1]
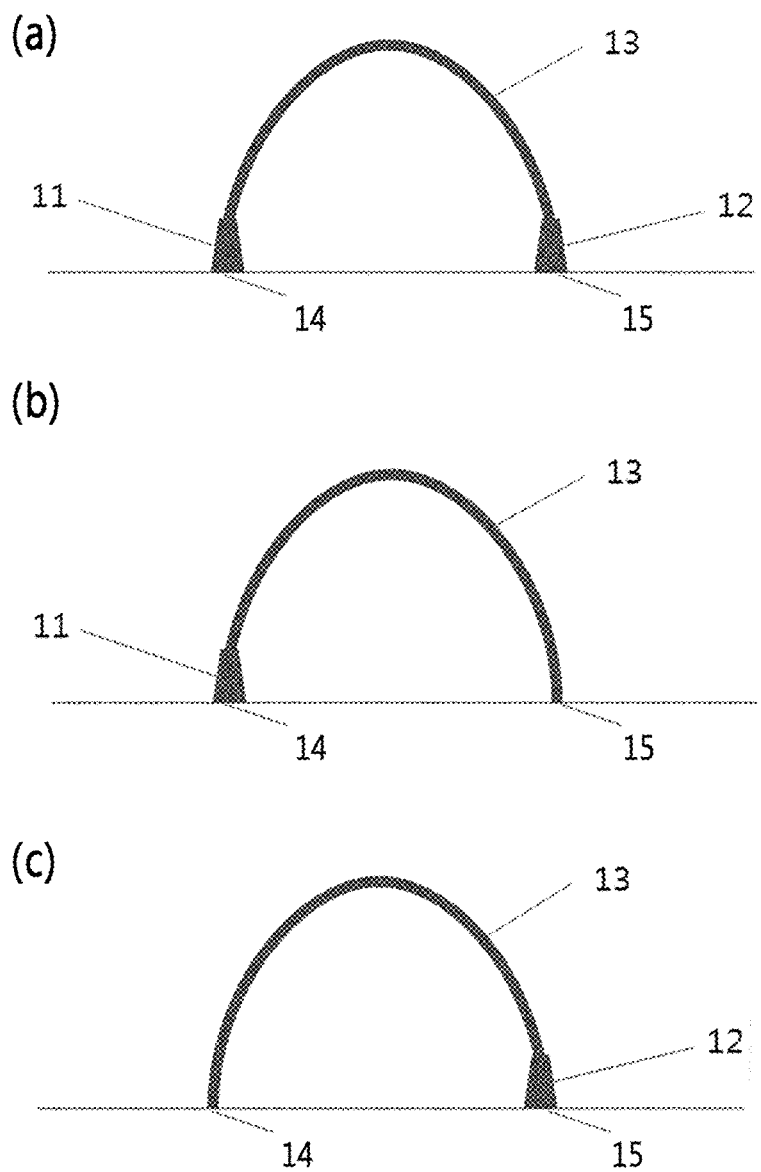

[fig. 2]
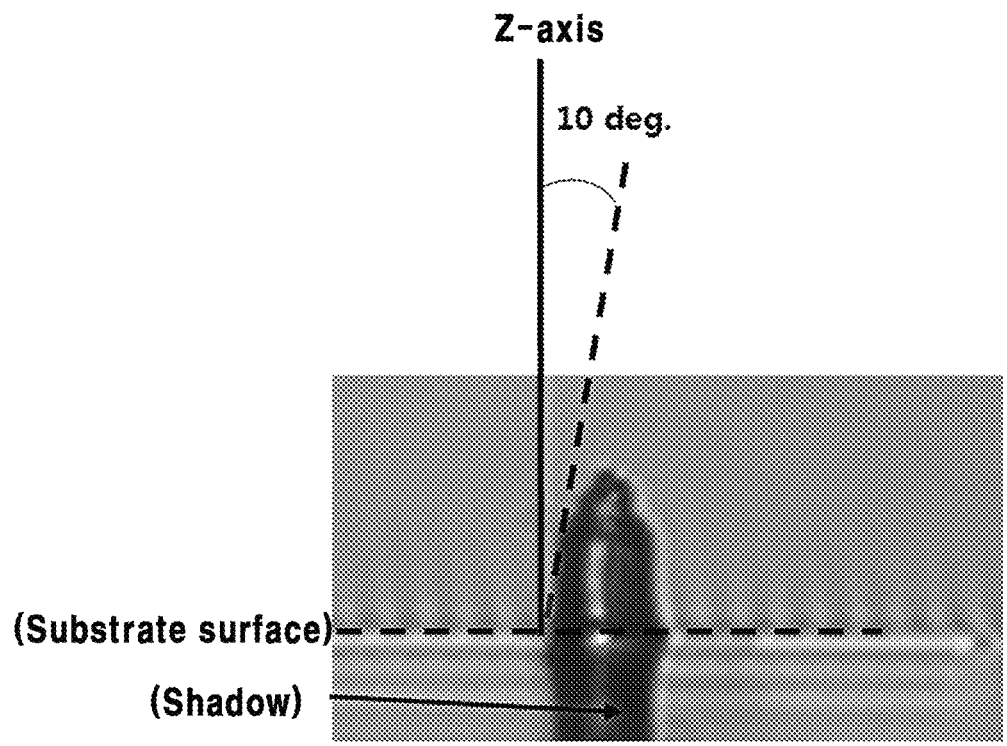

[fig. 3]
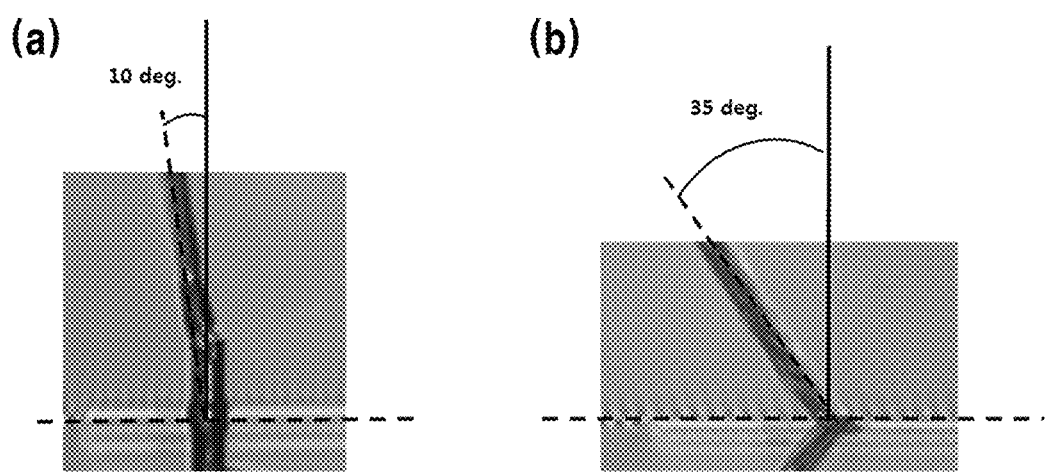

[fig. 4]
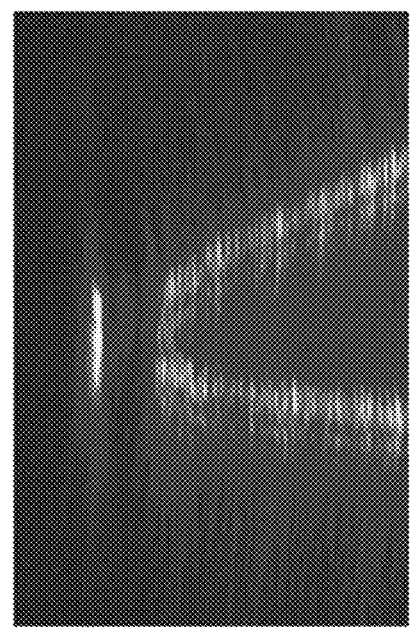
(b)
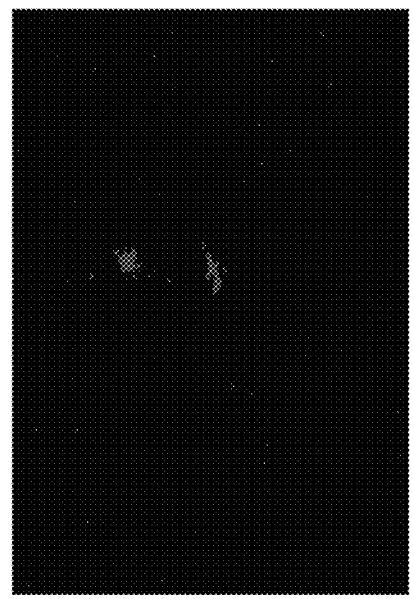
(a)

[fig. 5]
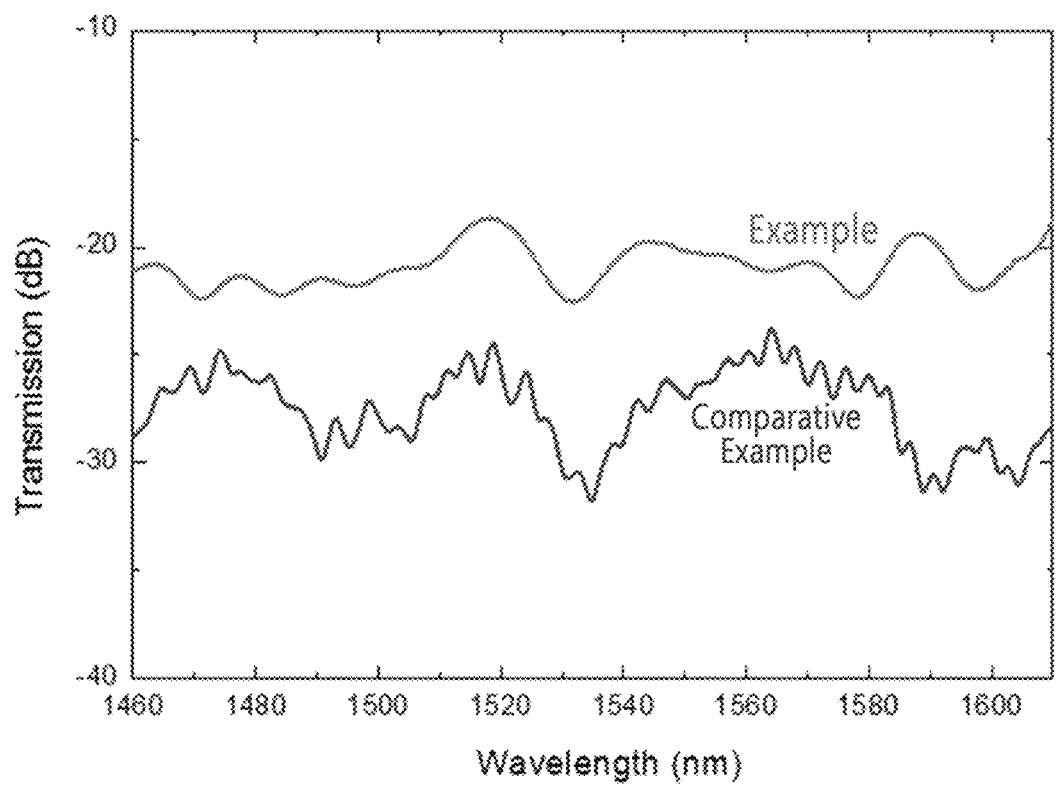

OPTICAL INTERCONNECTION AND METHOD FOR MAKING THE SAME

This application is the U.S. national phase of International Application No. PCT/KR2017/013683 filed 28 Nov. 2017, which designated the U.S. and claims priority to KR Patent Application No. 10-2017-0142404 filed 30 Oct. 2017, the entire contents of each of which are hereby incorporated by reference.

BACKGROUND OF THE INVENTION

Field of the Invention

The present invention relates to an optical interconnection and a method for making the same, and more particularly to an optical interconnection comprising a nanorod and a nanowire.

Description of the Prior Art

High-density photonic integrated circuits based on the assembly of nanoscale photonic elements are new future technologies that can go beyond the limits of electronic integrated circuits. Over the past decade, a variety of nanoscale photonic elements have been developed to achieve high-density photonic integrated circuits. The development of a technology for interconnecting these elements is a key challenge that is most fundamental for realizing nanoscale photonic integration. The most promising approach for interconnecting nanoscale elements is to integrate a nanowire waveguide between two spaced elements to allow evanescent coupling between them.

Up to now, technology for integrating nanowire optical waveguides has relied on the in-plane manual assembly of pre-synthesized nanowires. However, in-plane assembly has a problem in that the loss of light from a nanowire to a substrate occurs, and manual assembly using a microprobe or the like has problems in that the process is very complicated and a nanowire is likely to be damaged during the process.

In a conventional art, the direction of light is changed using a prism lens or the like, and then spaced contacts are interconnected by optical fibers (see Han-Soon Lee et al., Optics Express 22(10) 11778-11787 (2014)). In this case, light emitted from VCSEL should be aligned with the prism lens, and the light emitted therefrom should be aligned accurately with the optical fiber core. However, since the diameter of the optical fiber core is as small as about 10 µm, many defects occur due to mechanical errors occurring during alignment.

To overcome this problem, an active alignment method is used, but this method requires a lot of time and cost and still shows a significant defect rate. In addition, a device that is used in this method necessarily requires a prism device, and for this reason, there is a limitation in reducing the size.

Korean Patent No. 10-15583736 discloses an optical interconnection method in which a nanowire is three-dimensionally grown directly at a desired position. In this case, there is a problem in that light loss occurs because the nanowire is tilted and positioned while the nanowire is connected directly between the contacts.

SUMMARY OF THE INVENTION

In a conventional art in which a nanowire (optical fiber) is formed in a separate process and then used in optical interconnection, there is a problem in terms of process and cost (for example, because a control device such as a prism lens is required). The present invention has been made in order to solve this problem, and it is an object of the present invention to provide a technology that makes a nanowire and, at the same time, interconnects spaced contacts.

Another object of the present invention is to provide an optical interconnection comprising a nanorod and a nanowire, which can minimize the optical loss in the connection between a contact and/or the nanowire and/or the nanorod.

The present invention is directed to an optical interconnection for interconnecting a first contact and a second contact, which need to be optically interconnected, the optical interconnection comprising: a nanorod formed on at least one of the first contact and the second contact; and a nanowire extending from the first contact or the nanorod formed on the first contact so as to transmit an optical signal toward the second contact or the nanorod formed on the second contact.

Preferably, the nanorod has a cylindrical shape.

Preferably, the nanorod has a truncated cone shape such that the outer circumferential surface of the nanorod becomes narrower as the nanorod extends upward or downward.

Preferably, the nanorod has a truncated cone shape such that the outer circumferential surface of the nanorod becomes narrower as the nanorod extends upward.

Preferably, the outer circumferential surface of the nanorod has an angle of less than 35° (not including 0°) with respect to the vertical axis of the nanorod.

Preferably, the outer circumferential surface of the nanorod has an angle of 10° or less (not including 0°) with respect to the vertical axis of the nanorod.

Preferably, the lengthwise axis of the nanowire is perpendicular to the surface of the first contact, the second contact or the nanorod.

Preferably, the lengthwise axis of the nanowire has an angle of less than 35° (not including 0°) with respect to an axis perpendicular to the surface of the first contact, the second contact or the nanorod, which comes in contact with the nanowire.

Preferably, the nanorod is made by a method comprising the steps of: a) filling a nanorod material solution into a micropipette; b) coaxially aligning the lengthwise axis of the micropipette with an axis perpendicular to the surface of the contact; c) forming a meniscus of the nanorod material solution; and d) making a nanorod by evaporating the solvent from the nanorod material solution while lifting the micropipette in a direction perpendicular to the surface of the contact.

Preferably, the nanowire is made by a method comprising the steps of: a) filling a nanowire material solution into a micropipette; b) coaxially aligning the lengthwise axis of the micropipette with an axis extending from the first contact or the lengthwise axis of the nanorod formed on the first contact; c) forming a meniscus of the nanowire material solution; d) making a nanowire by evaporating the solvent from the nanowire material solution while lifting the micropipette; and e) brining the micropipette into contact with the second contact or the top of the nanorod disposed on the second contact.

The present invention is also directed to a method for making an optical interconnection three-dimensionally interconnecting a first contact and a second contact by a nanowire, the method comprising the steps of: a) filling a nanorod material solution into a micropipette; b) coaxially aligning the lengthwise axis of the micropipette with an axis perpendicular to the surface of the contact; c) forming a meniscus of the nanorod material solution; d) making a nanorod by evaporating the solvent from the nanorod material solution while lifting the micropipette in a direction perpendicular to the surface of the contact; e) filling a nanowire material solution into a micropipette; f) coaxially aligning the lengthwise axis of the micropipette of step e) with an axis extending from the first contact or the lengthwise axis of the nanorod formed on the first contact; g) forming a meniscus of the nanowire material solution; h) making a nanowire by evaporating the solvent from the nanowire material solution while lifting the micropipette; and i) bringing the micropipette into contact with either the second contact spaced apart from the first contact or the top of the nanorod disposed on the second contact.

Preferably, step d) comprises controlling the lifting speed of the micropipette such that the outer circumferential surface of the nanorod has a truncated conical shape becoming narrower as the nanorod extends upward or downward. Alternatively, step d) comprises controlling a pressure that is applied to the micropipette such that the outer circumferential surface of the nanorod has a truncated conical shape becoming narrower as the nanorod extends upward or downward.

BRIEF DESCRIPTION OF THE DRAWINGS

FIG. 1 is a schematic view illustrating optical interconnections made according to the present invention.

FIG. 2 shows an optical microscope image of a nanorod made according to the present invention.

FIG. 3 depicts optical microscope images showing optical interconnections of an example of the present invention and a comparative example, respectively.

FIG. 4 depicts optical microscope images showing light scattering in an example of the present invention and a comparative example.

FIG. 5 is a graph comparing the optical signal characteristics of an example of the present invention and a comparative example.

DETAILED DESCRIPTION OF THE INVENTION

All technical terms that are used in the present invention have the following definitions unless otherwise defined, and have the same meanings as commonly understood by those skilled in the art. In addition, although a preferred method or sample is described in the specification, those similar or equivalent thereto are also included in the scope of the present invention.

As used herein, the term "meniscus" means a curve that is formed in the surface of a liquid within a tube as a result of surface tension. The curve is concave or convex depending on the nature of the liquid.

As used herein, the term "first contact" means a portion that emits light. For example, the term includes a light source such as LED or LD, or means and devices for emitting light (including transmitting light), such as waveguides, optical fibers or the like. As used herein, the term "second contact" means a portion that receives the light that passed through an optical interconnection. For example, the term includes a direct light detection means such as a photodetector (PD), or means and devices for receiving light (including transmitting light), such as waveguides, optical fibers or the like.

The present invention is directed to an optical interconnection for optical connection between a first contact and a second contact, the optical interconnection comprising a nanorod and a nanowire. Particularly, the optical interconnection according to the present invention comprises: a nanorod formed on least one of a first contact and a second contact; and a nanowire extending from the first contact or the nanorod formed on the first contact so as to transmit an optical signal toward the second contact or the nanorod formed on the second contact.

The nanorod according to the present invention is formed on at least one of the first contact and the second contact. For example, the nanorod may be formed on the first contact, the second contact, or both the first contact and the second contact. Considering the characteristics of the making method, the optical loss in the second contact portion may more occur. For this reason, in order to reduce the optical loss in this portion, the nanowire made according to the present invention may preferably comprise the nanorod formed on the second contact.

FIG. 1 is a schematic view showing optical interconnections made according to the present invention. Specifically, FIG. 1(a) shows nanorods 11 and 12 formed on a first contact 14 and a second contact 15, respectively, and a nanowire 13 interconnecting the nanorods 11 and 12; FIG. 1(b) shows a nanorod 11, formed on a first contact 14, and a nanowire 13 interconnecting the nanorod 11 and a second contact (no nanorod is formed on the second contact 15); and FIG. 1(c) shows a nanorod 12, formed on a second contact 15, and a nanowire 13 interconnecting a first contact 14 and the nanorod 12 (no nanorod is formed on the first contact 14).

In one embodiment, the nanorod according to the present invention may have a cylindrical shape.

In another embodiment, the nanorod according to the present invention may have a truncated cone shape such that the outer circumferential surface of the nanorod becomes narrower as the nanorod extends upward or downward. Particularly, the outer circumferential surface of the nanorod has an angle of more than −35° to less than +35°, preferably −10° or more to +10° or less, with respect to the vertical axis of the nanorod. As used herein, the expression "vertical axis of the nanorod" means an axis perpendicular to the bottom of the nanorod (which is a portion coming in contact with the contact), and is shown as z-axis in FIG. 2. FIG. 3 shows an optical microscope image of a nanorod made according to the present invention. As used herein, the expression "vertical axis of the nanorod" means an axis vertical perpendicular to a direction in which the nanorod grows, that is, a surface on which the nanorod is formed.

For example, when light is to be transmitted in one direction from the first contact to the second contact, the nanorod on the second contact may have a reverse truncated cone shape such that the outer circumferential surface becomes narrower downward, in order to focus the light.

However, considering the fact that the size of the contact that emits and receives light is generally larger than the size of the optical interconnection and also considering the adhesion of the optical interconnection to the contact, the nanorod most preferably has a shape such that the outer circumferential surface thereof becomes narrower as it extends upward. Specifically, the outer circumferential surface of the nanorod may have an angle of less than 35° (not including 0°, preferably 10° or less (not including 0°, with respect to the vertical axis of the nanorod.

In addition, the height of the nanorod may be 0.5 μm or more, preferably 0.5 μm to 100 μm. If the height of the nanorod is less than 0.5 µm, the effect of reducing optical loss by the nanorod cannot be obtained, and if the height is more than 100 µm, it can affect the shape, size and the like of the resulting product. However, the height of the nanorod may be controlled considering the size of the nanorod, the nanowire, a substrate (chip) or the like, the distance between the contact, etc.

The bottom diameter of the nanorod may be 0.5 µm to 500 µm. The bottom diameter of the nanorod may be controlled depending on the size of the contact from which light is emitted, and the quantity of light emitted.

The nanorod according to the present invention may be made by a method comprising the following steps:
  a) filling a nanorod material solution into a micropipette;
  b) aligning the micropipette with a first or second contact;
  c) forming a meniscus of the nanorod material solution; and
  d) making a nanorod by evaporating the solvent from the nanorod material solution while lifting the micropipette in a direction perpendicular to the surface of the contact.

Hereinafter, each step of the method for making the nanorod will be described in detail.

First, the step of filling a nanorod material solution into a micropipette is performed. As used herein, the nanorod material solution means a solution containing a material that forms the nanorod. Examples of the nanorod material solution include all materials capable of forming a meniscus, and include most organic compounds. Specifically, as the material that forms the nanorod, polystyrene, methyl polymethacrylate, or polycarbonate may be used, and perfluorinated compounds (PFCs) such as CYTOP (amorphous fluoropolymer), polyimides, or epoxy compounds such as SU-8, may also be used. In addition, organic conductive polymers (π-conjugated polymers) may also be used, which are characterized in that their electrical and optical properties can be freely controlled by chemical doping. As the solvent of the nanorod material solution, an easily evaporating material (volatile material) may be used, and examples of the solvent include all materials that are used in the art.

The micropipette may be prepared to have a desired diameter by use of a pipette puller.

Next, the step of aligning the micropipette with a first or second contact is performed. Preferably, the micropipette is coaxially aligned such that the lengthwise axis of the micropipette lies in line with an axis perpendicular to the surface of the first or second contact. For alignment, the x-axis and the y-axis are preferably aligned using two optical lenses. When only one optical lens is used, coaxial alignment will be difficult due to errors occurring in other directions, and the nanorod which is to be grown using the micropipette will also not be coaxially aligned and grown, and thus the optical transmission loss in the connection will increase. For coaxial alignment, optical lenses for the x-axis and the y-axis are located perpendicular to each other.

Next, the step of forming a meniscus of the nanorod material solution is performed. In this step, the micropipette filled with the nanorod material solution is spaced apart from one end of an optical fiber so that the nanorod material solution forms a meniscus.

Finally, the step of making a nanorod by evaporating the solvent from the nanorod material solution while lifting the micropipette in a direction perpendicular to the surface of the contact is performed.

When the micropipette is lifted while maintaining a spacing capable of inducing a meniscus of the nanorod material solution, the dissolved material is solidified to form a cylindrical shape while the liquid in the micropipette evaporates quickly. The micropipette is lifted in the direction in which light is emitted, that is, a direction perpendicular to a portion in which the nanorod comes in contact with the contact.

In one embodiment, the micropipette may be lifted while gradually increasing or reducing the lifting speed so that the outer circumferential surface of the nanorod will have a shape becoming narrower as the nanorod extends upward or downward. The lifting speed (withdrawal speed) may be controlled considering the angle with respect to the vertical axis of the nanorod, the height of the height of the nanorod, etc.

In another embodiment, the pressure that is applied to the micropipette may be controlled so that the outer circumferential surface of the nanorod will have a shape becoming narrower as the nanorod extends upward or downward. If the pressure that is applied into the micropipette is increased, the diameter of the nanorod becomes larger increase while the amount of nanorod material solution discharged will increase, and if the pressure that is applied into the micropipette is decreased, the diameter of the nanorod becomes smaller while the amount of nanorod material solution discharged will decrease.

In addition, the optical interconnection according to the present invention may comprise a nanowire extending from the first contact or the nanorod formed on the first contact so as to transmit an optical signal toward the second contact or the nanorod formed on the second contact.

Preferably, the lengthwise axis of the nanowire according to the present invention is perpendicular to the surface of the first contact, the second contact or the nanorod, or the lengthwise axis of the nanowire has an angle of less than 35° with respect to an axis perpendicular to the surface of the first contact, the second contact or the nanorod, which comes in contact with the nanowire. In other words, according to the present invention, the contact portion between the nanowire and the first contact (or the nanorod formed on the first contact) or the second contact (or the nanorod formed on the second contact) is formed to have an angle of 0 to 35°, preferably 0° (i.e., perpendicular), with respect to an axis perpendicular to the surface of the first contact or the second contact. As the angle approaches 0°, it is advantageous for optical interconnection because no light scattering occurs. As used herein, the expression "lengthwise axis of the nanowire" means the central axis of the nanowire or the central axis in the direction in which the nanowire grows.

The diameter of the nanowire may be 500 µm or less, and preferably, may be equal to or smaller than the diameter of the nanorod.

Particularly, the nanowire according to the present invention may be made by a method comprising the following steps:
  a) filling a nanowire material solution into a micropipette;
  b) coaxially aligning the lengthwise axis of the micropipette with an axis perpendicular to the surface of the first contact or the top surface of the nanorod disposed on the first contact;
  c) forming a meniscus of the nanowire material solution;
  d) making a nanowire by evaporating the solvent from the nanowire material solution while lifting the micropipette; and
  e) brining the micropipette into contact with the second contact or the top of the nanorod disposed on the second contact.

Hereinafter, each step of the method for making the nanowire will be described in detail.

First, the step of filling a nanowire material solution into a micropipette is performed.

As used herein, the expression "nanowire material solution" means a solution containing a material capable of forming the nanowire. Examples of the nanowire material solution include all materials capable of forming a meniscus, and include most organic compounds. Specifically, as the material capable of forming the nanowire, polystyrene, methyl polymethacrylate, or polycarbonate may be used, and perfluorinated compounds (PFCs) such as CYTOP (amorphous fluoropolymer), polyimides, or epoxy compounds such as SU-8, may also be used. In addition, organic conductive polymers (π-conjugated polymers) may also be used, which are characterized in that their electrical and optical properties can be freely controlled by chemical doping. As the solvent of the nanowire material solution, an easily evaporating material (volatile material) may be used, and examples of the solvent include all materials that are used in the art.

Next, the step of coaxially aligning the micropipette with the top of the first contact or the nanorod formed on the first contact is performed. When the nanorod is formed on the first contact, the micropipette is preferably coaxially aligned with both an axis perpendicular to the surface of the first contact and the vertical axis of the nanorod formed on the first contact. For coaxial alignment, the x-axis and the y-axis are aligned using two optical lenses, like the method for making the nanorod.

Next, the step of forming a meniscus of the nanorod material solution is performed.

Next, the step of making a nanowire by evaporating the solvent from the nanorod material solution while lifting the micropipette is performed.

Specifically, when the micropipette is lifted while maintaining a spacing capable of inducing a meniscus of the nanowire material solution, the dissolved material is solidified to form a cylindrical shape while the liquid in the micropipette evaporates quickly. The lifting direction is determined considering the distance between the spaced first and second contacts, the lifting speed, etc., and should be controlled such that the direction of a certain portion of the nanowire made does not abruptly change. In particular, the lifting direction should be controlled so as to minimize the optical loss in the nanowire portion connected to the contact and/or the nanorod.

Finally, the step of brining the micropipette into contact with the second contact or the top of the nanorod disposed on the second contact is performed.

The nanorod and the nanowire may be made of the same material or different materials, preferably the same material.

The methods for making the nanorod and the nanowire are the same in principle in that they use a meniscus. These methods include the contents described in the manufacturing method of other parts except for the parts specifically mentioned. In addition the present invention includes the contents disclosed in Korean Patent No. 10-15583736.

The optical interconnection of the present invention may be applied to a part having spaced contacts which need to be optically interconnected.

When contacts are interconnected by a nanowire without using a nanowire, the nanowire will not be formed in a perpendicular direction on the surface of the contacts, but will be formed to be tilted in the lifting direction of the micropipette (i.e., a direction not perpendicular to the contacts), and for this reason, the optical coupling loss in the contact portion (the connection between the nanowire and the contact) will occur.

The optical interconnection according to the present invention is made by two separate processes: a first process of making the nanorod by lifting the micropipette in a direction perpendicular to the contact; and a second process of making the nanowire by lifting the nanowire in another contact in a direction not perpendicular to the contact. This can minimize the optical loss occurring in the connection.

The present invention is also directed to a method for making an optical interconnection three-dimensionally interconnecting a first contact and a second contact by a nanowire. Specifically, the method comprises the steps of: a) filling a nanorod material solution into a micropipette; b) coaxially aligning the lengthwise axis of the micropipette with an axis perpendicular to the surface of the contact; c) forming a meniscus of the nanorod material solution; d) making a nanorod by evaporating the solvent from the nanorod material solution while lifting the micropipette in a direction perpendicular to the surface of the contact; e) filling a nanowire material solution into a micropipette; f) coaxially aligning the lengthwise axis of the micropipette of step e) with an axis extending from the first contact or the lengthwise axis of the nanorod formed on the first contact; g) forming a meniscus of the nanowire material solution; h) making a nanowire by evaporating the solvent from the nanowire material solution while lifting the micropipette; and i) bringing the micropipette into contact with either the second contact spaced apart from the first contact or the top of the nanorod disposed on the second contact.

In addition, additional treatment for enhancing adhesion may be performed on the connection between the contact and the nanorod or between the contact and the nanowire or between the nanorod and the nanowire. Namely, before step a) or e) of the method for making the optical interconnection, additional treatment for enhancing adhesion may be performed on the portion to be connected (the contact or the nanorod), and it may be performed using any method known in the art.

Hereinafter, the present invention will be described in detail with reference examples. However, these examples are for illustrative purposes only and the scope of the present invention is not limited thereto.

Preparation of Example

Polystyrene powder was dissolved in a xylene solvent at a concentration of 0.5 wt % to prepare a nanorod material solution. The nanorod material solution was filled into a micropipette having a tip diameter of 0.5 μm. The micropipette was brought into contact with a first contact to form a meniscus of the nanorod material solution outside the opening of the micropipette. Nanorod growth was performed while controlling the lifting speed of the micropipette, thereby forming a nanorod having a bottom diameter of about 10 μm, a top diameter of about 8 μm, a height of about 6 μm, and an angle of 10° with respect to the vertical axis of the nanorod. The same nanorod was formed on a second contact in the same manner as described above. The spacing between the first contact and the second contact was about 500 μm.

Polystyrene powder was dissolved in a xylene solvent at a concentration of 0.5 wt % to prepare a nanowire material solution. The nanowire material solution was filled into the same micropipette as described above, and then was brought into contact with the top of the nanorod formed on the first contact, thereby forming a meniscus. While the micropipette was lifted to remove the solvent, a nanowire was grown. The formed nanowire had a diameter of about 8 μm. The micropipette was brought into contact with the top of the nanorod formed on the second contact of the chip, thereby obtaining an optical interconnection comprising the nanowire.

Preparation of Comparative Example

Polystyrene powder was dissolved in a xylene solvent at a concentration of 0.5 wt % to prepare a nanowire material solution. The nanowire material solution was filled into a micropipette having a tip diameter of 0.5 µm. The micropipette filled with the solution was brought into contact with a first contact of a chip to form a meniscus of the nanowire material solution outside the opening of the micropipette. While the micropipette was lifted to remove the solvent, a nanowire was grown. The micropipette was brought into contact with a second contact of the chip, thereby obtaining an optical interconnection comprising the nanowire. The formed nanowire had a diameter of about 8 µm, and the spacing between the first contact and the second contact was about 500 µm.

EXPERIMENTAL EXAMPLE 1

Comparison of Optical Microscope Images of Optical Interconnections

FIG. 3(a) is an optical microscope image showing the connection between the second contact, the nanorod and the nanowire, and FIG. 3(b) is an optical microscope image showing the connection between the second contact and the nanowire. FIGS. 4(a) and 4(b) are optical microscope images used to measure light scattering in the connection when light was passed through the optical interconnections of the example and the comparative example, respectively. In the example of the present invention, in which the nanorod was formed followed by formation of the nanowire, it can be seen that the nanowire had an angle of about 10° with respect to the axis perpendicular to the surface of the chip (FIG. 3(a)), and little or no light scattering occurred (FIG. 4(a)). However, in the comparative example in which no nanorod was formed, it can be seen that the nanowire had an angle of 35° with respect to the axis perpendicular to the surface of the chip (FIG. 3(b)), and significant light scattering occurred (FIG. 4(b)).

EXPERIMENTAL EXAMPLE 2

Comparison of Optical Signal Characteristics of Optical Interconnections

FIG. 5 is a graph comparing the optical signal characteristics of the example of the present invention and the comparative example. As can be seen therein, the comparative example had a transmission value of about −27 dB, whereas the example had a transmission value of about −21 dB, which was 6 dB higher than that of the comparative example. This suggests that the optical signal intensity of the example is about 4-fold higher than that of the comparative example.

As described above, the optical interconnection according to the present invention makes it possible to eliminate or minimize an optical loss that can be caused by the connection between the contact and the nanorod and/or the nanowire.

Furthermore, the optical interconnection according to the present invention shows improved optical signal characteristics due to a reduction in coupling loss.

In addition, the optical interconnection according to the present invention can be made in a simpler manner than a conventional art, and thus is advantageous in terms of cost and process. In addition, it is easily applied even to miniaturized products.

What is claimed is:

1. An optical interconnection for interconnecting a first contact and a second contact, which need to be optically interconnected, the optical interconnection comprising:
   a first nanorod formed on the first contact;
   a second nanorod formed on the second contact; and
   a nanowire extending from the first nanorod formed on the first contact so as to transmit an optical signal toward the second nanorod formed on the second contact,
   wherein each of the first and the second nanorods have a truncated cone shape such that the outer circumferential surface of each of the first and second nanorods becomes narrower as the respective nanorod extends away from the respective contact.

2. The optical interconnection of claim 1, wherein the outer circumferential surface of each of the first and second nanorods has an angle of less than 35° (not including 0°) with respect to a lengthwise axis of the nanorod.

3. The optical interconnection of claim 1, wherein the outer circumferential surface of each of the first and second nanorods has an angle of 10° or less (not including 0°) with respect to a lengthwise axis of the nanorod.

4. The optical interconnection of claim 1, wherein a lengthwise axis of the nanowire is perpendicular to a surface of the first contact, the second contact the first nanorod or the second nanorod.

5. The optical interconnection of claim 1, wherein a lengthwise axis of the nanowire has an angle of less than 35° (not including 0°) with respect to an axis perpendicular to a surface of the first contact, the second contact, the first nanorod, or the second nanorod, which comes in contact with the nanowire.

6. The optical interconnection of claim 1, wherein the first and second nanorods are made by a method comprising the steps of:
   a) filling a nanorod material solution into a micropipette;
   b) coaxially aligning a lengthwise axis of the micropipette with an axis perpendicular to a surface of an associated one of the first and second contact;
   c) forming a meniscus of the nanorod material solution; and
   d) evaporating a solvent from the nanorod material solution while lifting the micropipette in a direction perpendicular to the surface of the associated one of the first and second contact.

7. The optical interconnection of claim 1, wherein the nanowire is made by a method comprising the steps of:
   a) filling a nanowire material solution into a micropipette;
   b) coaxially aligning a lengthwise axis of the micropipette with a lengthwise axis of the first nanorod;
   c) forming a meniscus of the nanowire material solution;
   d) making the nanowire by evaporating a solvent from the nanowire material solution while lifting the micropipette; and
   e) bringing the micropipette into contact with an end of the second nanorod furthest from the second contact.

8. A method for making an optical interconnection three-dimensionally interconnecting a first contact and a second contact by a nanowire, the method comprising the steps of:
   a) filling a nanorod material solution into a micropipette;
   b) coaxially aligning a lengthwise axis of the micropipette with an axis perpendicular to a surface of the contact;
   c) forming a meniscus of the nanorod material solution in the coaxially aligned state;
   d) making a nanorod by evaporating a solvent from the nanorod material solution while lifting the micropipette in a direction perpendicular to the surface of the first contact;
   e) filling a nanowire material solution into a micropipette;
   f) coaxially aligning a lengthwise axis of the micropipette of step e) with an axis perpendicular to a surface of the first contact or a top surface of the nanorod disposed on the first contact;
   g) forming a meniscus of the nanowire material solution;
   h) making a nanowire by evaporating a solvent from the nanowire material solution while lifting the micropipette; and
   i) bringing the micropipette into contact with either the second contact spaced apart from the first contact or the top of the nanorod disposed on the second contact.

9. The method of claim 8, wherein step d) comprises controlling a lifting speed of the micropipette such that an outer circumferential surface of the nanorod has a truncated conical shape becoming narrower as the nanorod extends upward or downward.

10. The method of claim 8, wherein step d) comprises controlling a pressure that is applied to the micropipette such that an outer circumferential surface of the nanorod has a truncated conical shape becoming narrower as the nanorod extends upward or downward.

11. The optical interconnection of claim 1, wherein a lengthwise axis of the first nanorod is perpendicular to and intersects a surface of the first contact on which the first nanorod is formed.

12. The optical interconnection of claim 11, wherein a lengthwise axis of the second nanorod is perpendicular to and intersects a surface of the second contact on which the second nanorod is formed.

13. The optical interconnection of claim 1, wherein the first nanorod and the second nanorod are formed on the same substrate.

14. The optical interconnection of claim 13, wherein a lengthwise axis of the first nanorod and a lengthwise axis of the second nanorod are perpendicular to and intersect a surface of the substrate.

* * * * *